(12) United States Patent
Kobayashi et al.

(10) Patent No.: US 7,302,342 B2
(45) Date of Patent: Nov. 27, 2007

(54) IN-VEHICLE NAVIGATION APPARATUS

(75) Inventors: Nobuharu Kobayashi, Toyohashi (JP); Kiyoshi Tsurumi, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/376,211

(22) Filed: Mar. 16, 2006

(65) Prior Publication Data

US 2006/0212216 A1    Sep. 21, 2006

(30) Foreign Application Priority Data

Mar. 17, 2005    (JP)    ............................ 2005-077780

(51) Int. Cl.
G01C 21/00    (2006.01)
G01C 21/30    (2006.01)
G08G 1/123    (2006.01)

(52) U.S. Cl. ...................... 701/207; 701/117; 701/208; 701/209; 701/210; 701/214; 340/995.13; 340/995.19; 340/995.21; 340/995.22

(58) Field of Classification Search ........................ 340/995.1–995.28; 701/201, 207–208, 117–119, 701/202–206; 342/357.13
See application file for complete search history.

(56) References Cited

U.S. PATENT DOCUMENTS

| | | | | |
|---|---|---|---|---|
| 5,559,511 A | * | 9/1996 | Ito et al. ................. | 340/995.21 |
| 5,821,880 A | * | 10/1998 | Morimoto et al. ...... | 340/995.21 |
| 5,911,773 A | * | 6/1999 | Mutsuga et al. ............ | 701/200 |
| 6,061,628 A | * | 5/2000 | Hayashi et al. ............. | 701/208 |
| 6,064,941 A | * | 5/2000 | Nimura et al. .............. | 701/210 |
| 6,173,232 B1 | * | 1/2001 | Nanba et al. ............... | 701/209 |
| 6,226,591 B1 | * | 5/2001 | Okumura et al. ........... | 701/216 |
| 6,466,866 B1 | * | 10/2002 | Sato .......................... | 701/209 |
| 6,487,498 B2 | | 11/2002 | Saitou et al. | |
| 6,591,189 B2 | * | 7/2003 | Shimada ..................... | 701/209 |
| 6,658,353 B2 | * | 12/2003 | Shimizu et al. ............. | 701/214 |
| 7,031,831 B2 | * | 4/2006 | Kaji et al. .................. | 701/210 |

FOREIGN PATENT DOCUMENTS

| | | |
|---|---|---|
| JP | A-H7-129893 | 5/1995 |
| JP | A-H8-145706 | 6/1996 |
| JP | A-2004-257903 | 9/2004 |

* cited by examiner

*Primary Examiner*—Jack Keith
*Assistant Examiner*—Chuong Nguyen
(74) *Attorney, Agent, or Firm*—Posz Law Group, PLC

(57) ABSTRACT

When a first one-way traffic road becomes partially impassable because of roadworks, a second one-way traffic road temporarily replaces the first road and is used in a direction opposite to an original trafficable direction. This second road is registered as a replacing road based on traffic information from the VICS center. When the second road registered as the replacing road is present within a given area surrounding the current position of a relevant vehicle, map matching is executed without considering the original trafficable direction of the second road. This allows the second road to be designated as a travel road through the map matching even when the relevant vehicle travels in a direction opposite to the original trafficable direction of the second road.

6 Claims, 3 Drawing Sheets

IN-VEHICLE NAVIGATION APPARATUS

CROSS REFERENCE TO RELATED APPLICATIONS

This application is based on and incorporates herein by reference Japanese Patent Application No. 2005-77780 filed on Mar. 17, 2005.

FIELD OF THE INVENTION

The present invention relates to an in-vehicle navigation apparatus.

BACKGROUND OF THE INVENTION

An in-vehicle navigation apparatus uses radio navigation and self-contained navigation to detect a current position of the vehicle. In the self-contained navigation, a current position is estimated from values detected by a vehicle speed sensor and a bearing sensor (e.g., geomagnetic sensor and gyroscope); the estimated current position is collated with road map information (hereinafter, this process is called map-matching) to designate a current position. In the radio navigation, a current position is estimated based on radio waves from satellites; the estimated current position is also subjected to map-matching to designate a current position. To more accurately designate a current position, both the radio navigation and self-contained navigation are used.

A map-matching technology considering roads' traffic directions is described in an in-vehicle navigation apparatus in Patent Document 1. Two roads parallel to each other less than a given interval therebetween may be located around a current position estimated from sensors. Here, of the two roads, a road located left relative to a vehicle's advancing direction is subjected to map-matching: in a two-way expressway in the Japanese traffic system has two one-way traffic roads parallel to each other, a road located left relative to the vehicle's advancing direction is typically trafficable for the vehicle. The navigation apparatus in Patent Document 1 is thus able to accurately designate a current position even if the vehicle travels one of two one-way traffic roads parallel to each other.

However, vehicles do not always travel a left road of two parallel roads because of recent complexity in road configuration. A recent in-vehicle navigation apparatus has one-way traffic information indicating a trafficable direction in road data of a link corresponding to a one-way traffic road. With the indicated trafficable direction and advancing direction considered in map-matching, a current position of the vehicle is designated.

Even a one-way traffic road may be temporarily used in a direction opposite to its original trafficable direction because of roadworks or the like. Here, the trafficable direction indicated by the road data of a certain one-way traffic road cannot be used properly for map-matching: if a vehicle travels the certain one-way traffic road in the direction opposite to the original trafficable direction, the certain one-way traffic road cannot be designated in the map-matching. A nearby road might be mistakenly designated or no road can be designated.

Patent Document 1: JP-H8-145706 A

SUMMARY OF THE INVENTION

It is an object of the present invention to provide an in-vehicle navigation apparatus capable of solving the above problem. The apparatus can properly perform map-matching even if a one-way traffic road is temporality used in a direction opposite to its original trafficable direction.

To achieve the above object, a navigation apparatus in a vehicle is provided with the following: a position detector is included for detecting a current position of the vehicle; an advancing direction detecting unit is included for detecting an advancing direction of the vehicle; a road data storage unit is included for storing road data, where a road includes at least one link, each link assigned information indicating a position of the each link, wherein a link corresponding to a one-way traffic road is assigned one-way traffic information including a trafficable direction; a map matching unit is included for extracting a link within an area surrounding the detected current position from the road data storage unit to designate a travel road that the vehicle travels from a map-matching candidate road that includes the extracted link, wherein a certain road including the extracted link is excluded from the map-matching candidate road when the extracted link included in the certain road is assigned one-way traffic information indicating a trafficable direction not agreeing with the detected advancing direction; and a registering unit is included for executing registration to register a one-way traffic road temporarily used in a direction opposite to a trafficable direction. Here, the map matching unit regards a link included in the registered one-way traffic road as a link assigned no one-way traffic information.

Under the above structure, when a registered one-way traffic road is present around the current position of the vehicle, the registered one-way traffic road is allowed to be subjected to map-matching even if the vehicle travels the registered one-way traffic road in a direction opposite to its original trafficable direction. This can prevent problem that, if a vehicle travels a certain road of a one-way traffic road in a direction opposite to an original trafficable direction, another nearby road or no road might be mistakenly designated without the certain road properly designated.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
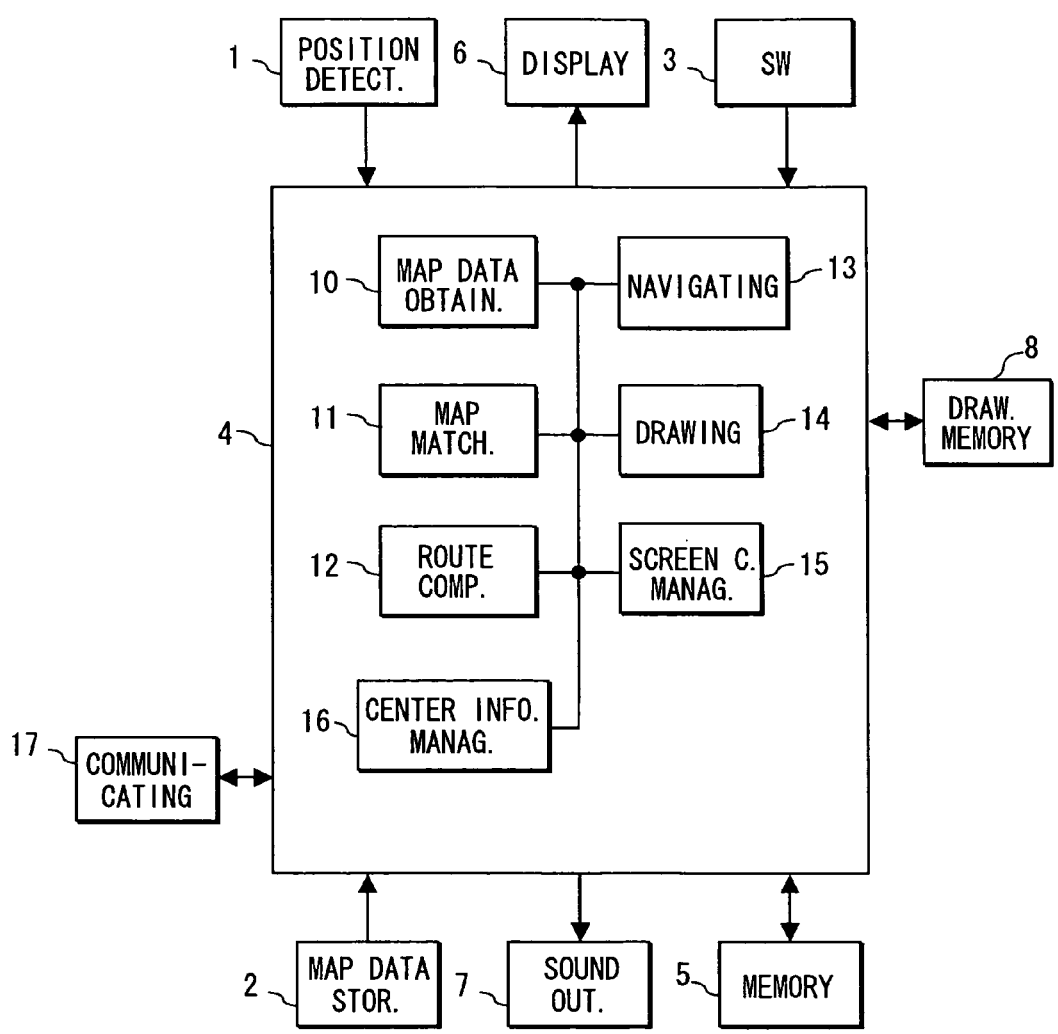
FIG. 1 is a block diagram of an overall structure of a navigation apparatus according to an embodiment of the present invention.
Figure 2:
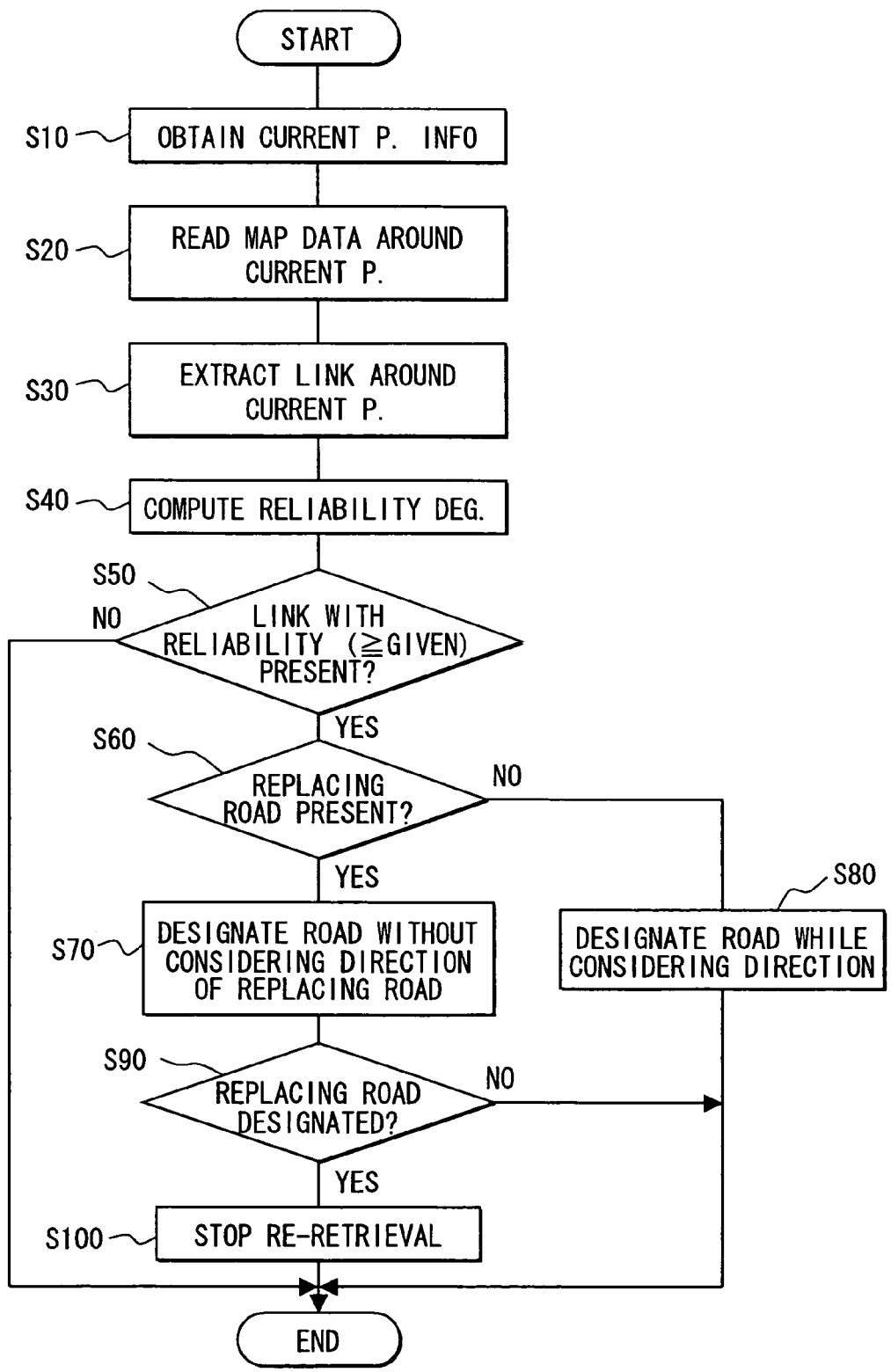
FIG. 2 is a flowchart diagram of a process executed by a control unit.
Figure 3:
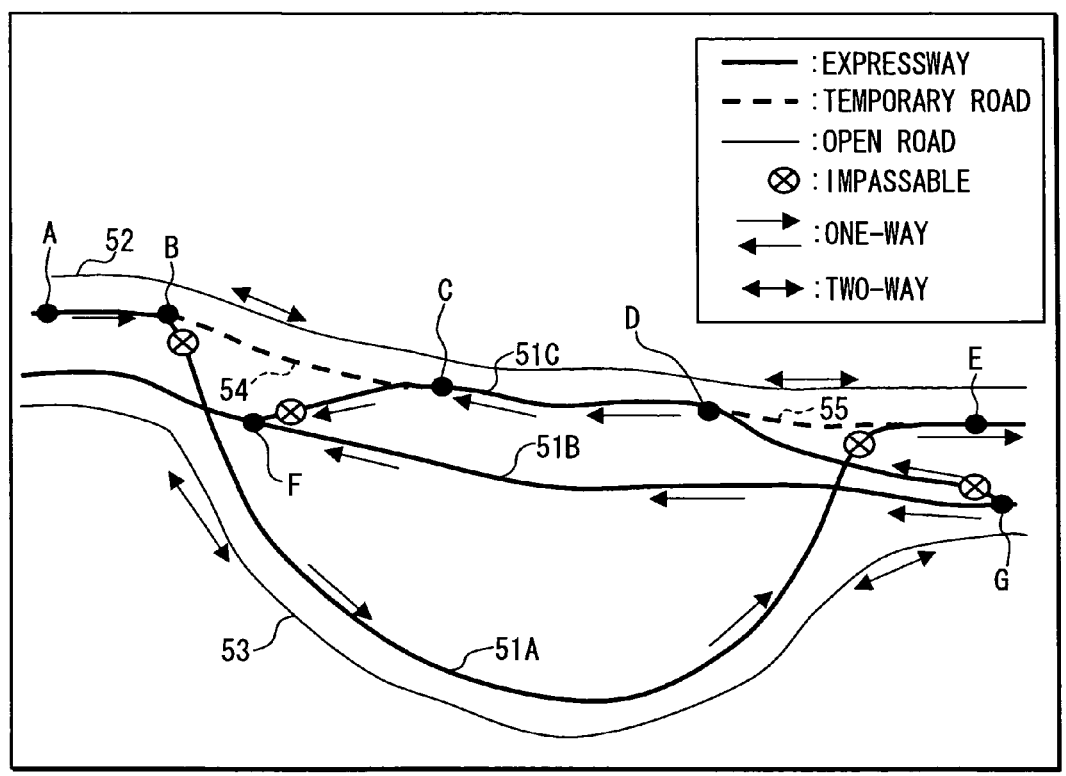
FIG. 3 is a view showing related roads including a travel road, a replaced road, and a replacing road.

An in-vehicle navigation apparatus according to an embodiment of the present invention will be explained with reference to FIGS. 1 to 3. As shown in FIG. 1, a navigation apparatus 100 in a vehicle includes a position detector 1, a map data storage unit 2, a manipulation switch group 3, a memory unit 5, a display unit 6, a sound output unit 7, a drawing memory unit 8, a communicating unit 17, and a control unit 4 connecting the foregoing components.

The position detector 1 includes a known geomagnetic sensor, gyroscope, distance sensor, and GPS (Global Positioning System) receiver for detecting a current position of the vehicle based on radio waves from satellites. These sensors or the like have individually different types of errors: they are used to amend detection values of each other. Depending on required detection accuracy, only part of them may be used. A steering rotation sensor or a wheel speed sensor may be used. As explained later, the control unit 4 executes map matching to designate a current position based on map data stored in the map data storage unit 2 and a current position or signals detected by the position detector 1.

The map data storage unit 2 is for inputting data such as road data, background data, or landmark data. A storage media for storing the data may be a read-only storage media such as a CD-ROM or DVD-ROM, or a rewritable storage media such as a hard disk or memory card.

The road data include node data and link data. A road indicated on a map is broken down by nodes into links between the nodes: the road is formed of links connected with each other. The nodes include points intersecting, merging, or branching on a map. Link data include, with respect to each link, a link ID identifying the link, a link length indicating the length of the link, coordinates (longitudes and latitudes) of start point and end point of the link, a road name of a road including the link, a road kind, a road width, the number of lanes, presence or absence of a traffic (e.g., right-turn, left-turn) directed lane, the number of the directed lanes, and a regulatory limiting speed. Furthermore, a link corresponding to a one-way traffic road (or a link included in the one-way traffic road) is assigned information indicating a trafficable direction (or assigned one-way traffic information including a trafficable direction).

Node data include, with respect to each node, a node ID identifying the node, node coordinates, a node name, connecting link IDs indicating links connected with the node, and an intersection kind of the node.

In retrieval of a route from a current position to a destination, a passage cost indicating an easiness degree in passing through each link or node is computed based on properties of each link (e.g., link length, road kind, road width) and a kind of each node (e.g., straight travel, right turn, or left turn). A route having minimum additive passage costs of each link and each node from a current position to a destination can be retrieved using a route retrieval method such as the Dijkstra method.

The manipulation switch group 3 includes mechanical switches or touch switches integrated on the display unit 6 for inputting a starting point or a destination in route retrieval.

The display unit 6 includes a liquid crystal display for displaying information on its screen, e.g., a vehicle's position mark and a road map around the vehicle. The vehicle's position mark corresponds to a vehicle's current position designated based on detection signals from the position detector 1 and map data. The road map is generated with road data, background data, or landmark data inputted from the map data storage unit 2. The road map can be changed in its display scale or scrolled through the manipulation switch group 3.

The sound output unit 7 includes a speaker for reporting information using sounds or voices such as voice guidance while navigating.

The communicating unit 17 communicates using wireless communications with external units or the like, e.g., a VICS (Vehicle Information and Communication System) sensor receiving traffic information from a VICS center via an FM broadcast station or a beacon laid down under a road. In this embodiment, based on traffic information from the VICS center, a replacing road and replaced road are registered, which will be explained later.

The memory unit 5 includes a RAM or flash memory to store data such as an inputted or designated destination.

The drawing memory unit 8 includes a VRAM to temporarily store data for the display unit 6, e.g., map data only having several window screens in displaying a road map around a current position. A road map corresponding to given part of the map data only having several window screens is displayed on the display unit 6. Storing several window screens allows a prompt scroll display according to an instruction.

The control unit 4 includes a known computer containing a CPU, ROM, RAM, I/O, and bus line connecting the foregoing components. The ROM includes a program for the control unit 4 to execute, e.g., to cause the CPU to process. The program can be obtained from outside units or the like via the memory unit 5. Furthermore, for executing individual processes, the control unit 4 includes a map data obtaining unit 10, a map matching unit 11, a route computing unit 12, a navigating unit 13, a drawing unit 14, a screen control managing unit 15, and a center information managing unit 16.

The map data obtaining unit 10 obtains a given range of map data from the map data storage unit 2, e.g., map data around a current position in displaying a corresponding road map.

The map matching unit 11 designates (i) a travel road the vehicle is currently traveling or located on or (ii) a vehicle's current position, based on vehicle's travel tracks, road data of map data obtained from the map data obtaining unit 10, and positional information detected by the position detector 1. The map matching unit 11 basically executes no map matching for a certain one-way traffic road opposite to the advancing direction of the vehicle: this certain one-way traffic road includes a link that is assigned information of a trafficable direction opposite to the advancing direction of the vehicle. However, if the certain one-way traffic road is registered as a replacing road, the certain one-way traffic road being a replacing road can be included in a map-matching candidate road and map matching is exceptionally executed for the certain one-way traffic road being a replacing road, which will be explained later with a flowchart.

The route computing unit 12 computes a recommended route from a starting point to a destination, both of which are designated by a user. More specifically, a minimum-cost route is retrieved based on road data of the map data obtained by the map data obtaining unit 10 using the Dijkstra method or the like.

The route computing unit 12 re-computes a route to the destination if the vehicle departs from the recommended route to a certain road that is not included in the recommended route.

However, when the certain road is registered as a replacing road, a route is not re-computed. At this time, the vehicle advances on the certain road, as a replacing road, in a direction opposite to a trafficable direction of the certain road: if a route is re-computed, a re-computed route does not include the certain road. In other words, re-computing a route is unnecessary at this time since the vehicle naturally returns to the recommended route after passing through the certain road being a replacing road.

The navigating unit 13 navigates the vehicle or a user of the vehicle along a recommended route (or guides the vehicle along a recommended route) computed by the route computing unit 12. For instance, the navigating unit 13 extracts a point necessary for navigating from positional information relating to an intersection or road data stored in the map data, or computes necessary guidance (such as right turn or left turn). The navigating unit 13 further transmits sound signals to the sound output unit 7 for voice guidance based on a current position designated by the map matching unit 11.

The screen control managing unit 15 controls display items on the display unit 6, e.g., causing the drawing unit 14 to display a road map around a current position or an expanded map around an intersection on approaching the intersection where the vehicle is to turn right or left. The drawing unit 14 displays the road map or the like accordingly.

The center information managing unit 16 manages and stores traffic information or the like via the communicating unit 17, e.g., information relating to a replacing road or replaced road in this embodiment.

Next, map matching process by the control unit 4 will be explained with reference to FIGS. 2, 3, under an assumption that the vehicle is traveling at a point A on a road 51A shown in FIG. 3. Further, roads 51A, 51B, 51C are individually one-way traffic roads within expressways: links corresponding to the roads 51A, 51B, 51C are assigned one-way traffic information.

The road 51A is impassable or not trafficable in a section from a point B to a point E because of roadworks. A replacing route is temporarily prepared by using temporary roads 54, 55 (B to C, D to E) and the road 51C (C to D): in this case, the road 51C is used in a direction opposite to an original trafficable direction.

More specifically, in this case, the road 51C cannot be used for traveling in the original trafficable direction from a point G to a point F since vehicles travel temporarily in the direction opposite to the original trafficable direction. Open roads 52, 53 are provided along with the roads 51A, 51B, 51C. No road data is provided to the temporary roads 54, 55.

To accurately perform map matching in using the road 51C in the opposite direction from the point C to point D, registration is necessary for a replacing road (road 51C) and a replaced road (road 51A from the point B to point E). This registration is conducted based on traffic information from the VICS center: the center information managing unit 16 stores information relating to an impassable road (or replaced road) and its corresponding replacing road when the information is received via the communicating unit 17. For instance in FIG. 3, a replaced road is registered as the road 51A (section from the point B to point E), while a replacing road as the road 51C (from the point G to point F).

A process shown in FIG. 2 will be explained under the above-described situation. At Step S10, current position information (detected current position) of the vehicle is obtained using the position detector 1. The vehicle is now traveling the road 51A at the point A as explained above: current position information corresponding to the point A is obtained.

At Step S20, map data is read out from the map data storage unit 2 with respect to an area surrounding the detected current position.

At Step S30, a link included in the road data of the read map data is extracted. Here, in the area surrounding the point A, the roads 51B, 52, 53 as well the road 51A are closely existing: links corresponding to these roads 51A, 51B, 52, 53 are extracted as map-matching candidate roads or links.

At Step S40, with respect to each extracted link, a reliability degree indicating whether the vehicle is now traveling each link is computed based on a distance from the detected current position, a difference in the traffic direction from the current advancing direction of the vehicle, and the travel track. For instance in FIG. 3, the vehicle has been traveling the road 51A so for. With the travel track considered, the link corresponding to the road 51A is computed to have a maximum reliability degree.

At Step S50, it is determined whether there is a link whose reliability degree computed at Step S40 is a given value or more. When this determination is negated, the following process is no more executed: a mark for indicating a current position on a road map is displayed at a position corresponding to the current position information. In contrast, the determination is affirmed, the sequence of the flowchart advances to Step S60. For instance in FIG. 3, the reliability degree relative to the road 51A is assumed to be the given value or more, so the determination at Step S50 is affirmed. Further, a reliability degree relative to each or any one of the links corresponding to the roads 51B, 52, 53 close to the road 51A at the point A may be also the given value or more.

At Step S60, it is determined whether a certain link corresponding to a registered replacing road is present with respect to the link(s) affirmatively determined at Step S50 or, more specifically, whether a corresponding replacing road is included in the traffic information stored in the center information managing unit 16. When the determination at Step S60 is affirmed, the sequence goes to Step S70; while negated, to Step S80. Under the above explained situation, a replacing road is registered as the road 51C between the point G and point F. However, when the vehicle is located at the point A, the road 51C or corresponding link is not included in a map-matching candidate road or link, which results in negation of the determination at Step S60.

At Step S80, a travel road that is a road the vehicle is currently traveling is designated: the travel road is corresponded to by the link whose reliability degree is the given value or more and more than a reliability degree of any other extracted link. Here, if a link is assigned one-way traffic information, it is determined whether a trafficable direction of this link agrees with the advancing direction of the vehicle. When the trafficable direction does not agree, this link is excluded from the map-matching candidate road. Execution of a map matching process can be thereby prevented for a one-way traffic road on which a vehicle needs to advance in a direction opposite to a trafficable direction of the one-way traffic road. The link corresponding to the road 51A that the vehicle has been traveling has naturally the highest reliability degree, so that the road 51A is designated as a travel road with the map matching. Hereinafter, that a road is designated as a travel road using map matching is referred to as that a road is map matched. Here, the point A on the road map displayed on the display unit 6 is given a mark for indicating a current position of the vehicle.

When a registered replacing road is not present close, the above Steps S10 to S80 are repeated and the road 51A is repeatedly map matched.

When reaching the point B, the vehicle starts to travel the temporary road 54 instead of the road 51A being impassable from the point B to point E. Since the temporary road 54 is not existing in the road data, the road 51A is still map matched at Steps S10 to S80 until the vehicle approaches the road 51C and enters a certain area where the road 51C is included in map-matching candidate roads or links extracted at Step S30: with the travel track considered, the link corresponding to the road 51A is assumed to have the highest reliability degree before entering the certain area. When the vehicle enters the certain area where the link corresponding to the road 51C is included in the extracted link, the determination at Step S60 is affirmed, which advances the sequence to Step S70.

At Step S70, a map matching process is executed without considering one-way traffic information of a link corresponding to the registered replacing road: even the link as a replacing road whose original trafficable direction not according with the advancing direction of the vehicle can be a map-matching candidate road. Thus, the road 51C can be map matched if a link to which the road 51C corresponds has the highest reliability degree.

At Step S90, it is determined whether the map matched road corresponds to a replacing road. When the determination at Step S90 is negated, a process below is executed no more. In contrast, when affirmed at Step S90, the sequence advances to Step S100. As explained above, the route computing unit 12 typically executes a re-retrieval to re-compute a new recommended route to the destination if the vehicle departs from the recommended route to a certain road that is not included in the recommended route. However, at Step S100, a re-retrieval for a recommended route is prohibited. In other words, even when, while navigated along the recommended route, the vehicle departs from the recommended route including the road 51A (from the point B to point E) to the replacing road (road 51C), a re-retrieval due to this departing from the recommended route is not executed. This is because the vehicle will thereafter return to the recommended route, requiring no execution of the re-retrieval.

Thus, after the vehicle passes through the temporary road 54 and enters the replacing road 51C, the replacing road 51C is map matched. While traveling the temporary road 54, the replacing road 51C may be map matched; however, this produces no problem since the vehicle will be shortly traveling the replacing road 51C.

After having traveled through the replacing road 51C, the vehicle starts to travel the temporary road 55 at the point D. The replacing road 51C is still map matched until approaching the road 51A to enter a certain area where a link corresponding to the replaced road 51A is included in the extracted link at Step S30 since the temporary road 55 is not existing in the road data. With the travel track considered, the link corresponding to the replacing road 51C is assumed to have the highest reliability degree before entering the certain area. After the vehicle enters the certain area where the link corresponding to the road 51A is included in the extracted links, the road 51A may be map matched instead of the road 51C. After the vehicle passes through the temporary road 55 and then enters the road 51A at the point E, the road 51A is naturally map matched.

Conventionally, while the vehicle travels the replacing road 51C, this replacing road 51C cannot be map matched and another road may be map matched instead. In contrast, this embodiment allows a road the vehicle is actually traveling to be properly map matched.

Thus, this embodiment is able to register a one-way traffic road temporarily used in the direction opposite to its original trafficable direction using traffic information provided from the VICS center. A replacing road having been registered can be map matched when a relevant vehicle travels the replacing road. This prevents another road from being mistakenly map matched.

In the above explanation, information relating to a registered replaced road is not used in a map matching process; however, this information relating to a replaced road can be effectively used. For instance, at Step S30, if a replacing road and its corresponding replaced road are raised at the same time as map-matching candidate roads, one-way traffic information can be used for map matching without distinction even with respect to the replacing road. When the replacing road and its corresponding replaced road coexist, the replacing road assigned the trafficable direction opposite to the advancing direction dare not be selected as a map-matching candidate road. Further, this allows the replaced road to promptly become map matched when the vehicle moves from the replacing road to the replaced road.

Furthermore, a replacing road 51C may be raised as a map-matching candidate road when the vehicle has been traveling the corresponding replaced road 51A (e.g., before the point B). In this case, the replacing road 51C can be preferentially map matched. In contrast, the replaced road 51A may be raised as a map-matching candidate road when the vehicle has been traveling the corresponding replacing road 51C. In this case, the replaced road 51A can be preferentially map matched. This prevents another road such as a road 52 from being map matched even while traveling the temporary roads 54, 55.

(Modification)

The above embodiment can be modified without departing from the scope of the invention. For instance, a replacing road and replaced road can be differently registered instead of using traffic information from the VICS center. When a replacing road for possible roadworks is previously designated in generating corresponding road data, the road data can initially store information of the replacing road and replaced road or a user can register it.

Furthermore, a replacing road and replaced road may belong to an open road or the like, instead of an expressway.

Furthermore, the present invention can be adapted to a case where either or both of temporary roads 54, 55 connecting a replaced road 51A with a replacing road 51C may be not existing.

The registration of the replaced road and replacing road may be released when a roadwork or the like is completed. This release of the registration may be executed by releasing it automatically or through a user's manipulation when receiving from the VICS center traffic information indicating an original road situation is recovered because of the completion of the roadwork or the like. Furthermore, it can be also released automatically or through a user's manipulation when receiving information not including any information relating to a replaced road and replacing road.

Furthermore, other than a roadwork or the like, an event such as a parade may cause a road to be temporarily impassable and a corresponding replacing road being a one-way traffic road to be used in a direction opposite to an original trafficable direction.

Individual processing or execution explained in the above embodiment, e.g., using the flowchart can be constructed as a unit or means in a program stored in the ROM or the like and executed by using the CPU or the like.

It will be obvious to those skilled in the art that various changes may be made in the above-described embodiments of the present invention. However, the scope of the present invention should be determined by the following claims.

What is claimed is:

1. A navigation apparatus in a vehicle, comprising:
   a position detector configured to facilitate detecting a current position of the vehicle;
   an advancing direction detecting unit configured to facilitate detecting an advancing direction of the vehicle;
   a road data storage unit configured to facilitate storing road data, where a road includes at least one link, each link assigned information indicating a position of the each link, wherein a link corresponding to a one-way traffic road is assigned one-way traffic information including a trafficable direction;

a map matching unit configured to facilitate extracting a link within an area surrounding the detected current position from the road data storage unit to designate a travel road that the vehicle travels from a map-matching candidate road that includes the extracted link, wherein a certain road including the extracted link is excluded from the map-matching candidate road when the extracted link included in the certain road is assigned one-way traffic information indicating a trafficable direction not agreeing with the detected advancing direction; and a registering unit configured to facilitate executing registration to register a one-way traffic road temporarily used in a direction opposite to a trafficable direction, wherein the map matching unit is configured to facilitate regarding a link included in the registered one-way traffic road as a link assigned no one-way traffic information.

2. The navigation apparatus of claim 1, further comprising:

a designating unit configured to facilitate designating a destination; and a route computing unit configured to facilitate retrieving a route to the designated destination from a current position detected by the position detector, wherein the route computing unit is configured to stop retrieving another route when the vehicle departs from the retrieved route and the registered one-way traffic road is designated as the travel road.

3. The navigation apparatus of claim 1, wherein the registering unit is configured to register, a road allowing the vehicle to travel in a direction opposite to a trafficable direction of the road as a replacing road, and a road temporarily impassable as a replaced road corresponding to the replacing road, and the map matching unit is configured to check if both a link included in the replacing road and a link included in the replaced road are included within the area surrounding a current position detected by the position detector, and the map matching unit is configured, if both are included, to stop regarding the link included in the replacing road as the link assigned no one-way traffic information.

4. The navigation apparatus of claim 3, wherein the map matching unit is configured to check if both the link included in the replacing road and the link included in the replaced road are included within the area surrounding a current position detected by the position detector, and the map matching unit is configured, if both are included and if the replacing road has been a travel road, to designate the travel road as the replaced road.

5. The navigation apparatus of claim 1, further comprising:

a releasing unit configured to release the registration executed by the registering unit.

6. A navigation apparatus in a vehicle, comprising:

a position detector configured to facilitate detecting a current position of the vehicle;

an advancing direction detecting unit configured to facilitate detecting an advancing direction of the vehicle;

a road data storage unit configured to facilitate storing road data, where a road includes at least one link, each link assigned information indicating a position of the each link, wherein a link corresponding to a one-way traffic road is assigned one-way traffic information including a trafficable direction;

a map matching unit configured to facilitate extracting a link within an area surrounding the detected current position from the road data storage unit to designate a travel road that the vehicle travels from a map-matching candidate road that includes the extracted link, wherein a certain road including the extracted link is excluded from the map-matching candidate road if the extracted link included in the certain road is assigned one-way traffic information indicating a trafficable direction not agreeing with the detected advancing direction;

a registering unit configured to facilitate executing registration to register a one-way traffic road temporarily used in a direction opposite to a trafficable direction;

a designating unit configured to facilitate designating a destination; and a route computing unit configured to facilitate retrieving a mute to the designated destination from a current position detected by the position detector, wherein the route computing unit is configured to stop retrieving another route if the vehicle departs from the retrieved route and the registered one-way traffic road is designated as the travel road, wherein the map matching unit is configured to facilitate regarding a link included in the registered one-way traffic road as a link assigned no one-way traffic information, wherein the registering unit is configured to register a road allowing the vehicle to travel in a direction opposite to a trafficable direction of the road as a replacing road, and a road temporarily impassable as a replaced road corresponding to the replacing road, wherein the map matching unit is configured to check if both a link included in the replacing road and a link included in the replaced road are included within the area surrounding a current position detected by the position detector, and wherein the map matching unit is configured, if both are included, to stop regarding the link included in the replacing road as the link assigned no one-way traffic information.

* * * * *